March 1, 1932.　　　　F. SEUFERT　　　　1,847,312
FILM FEEDING MECHANISM FOR CINEMA OR LIKE APPARATUS
Filed May 12, 1930　　2 Sheets-Sheet 1
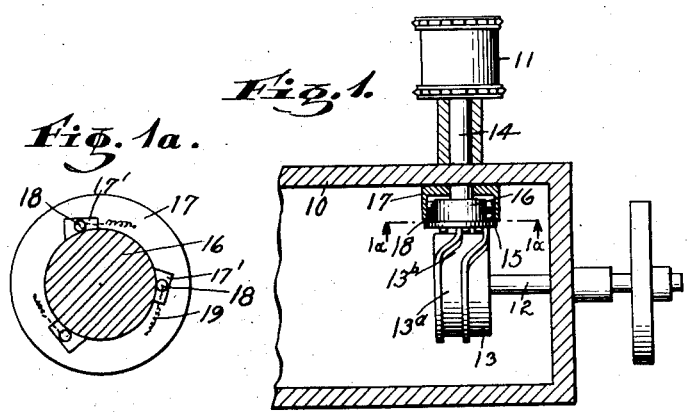
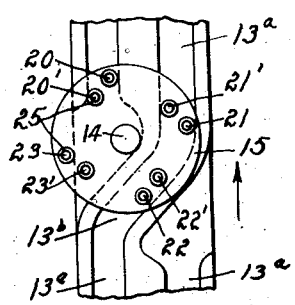
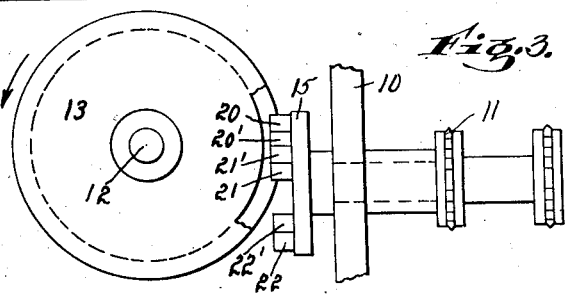
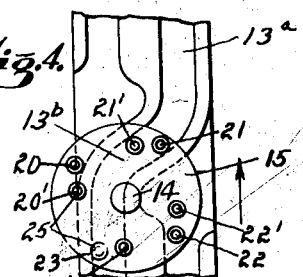
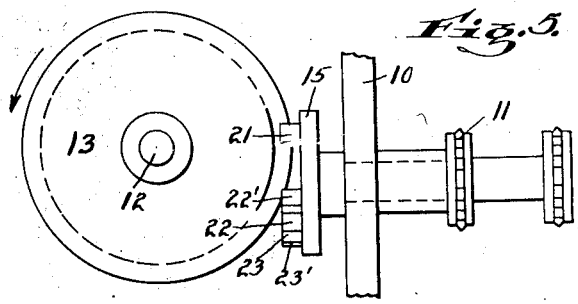
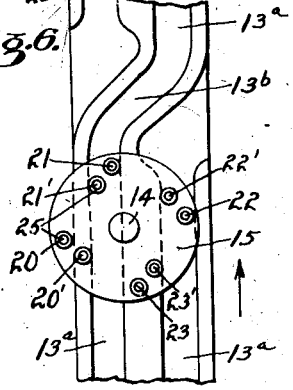
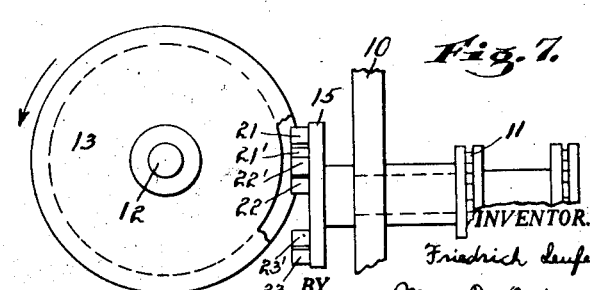
INVENTOR.
Friedrich Seufert
BY Max D. Ordmann
ATTORNEY March 1, 1932.  F. SEUFERT  1,847,312
FILM FEEDING MECHANISM FOR CINEMA OR LIKE APPARATUS
Filed May 12, 1930  2 Sheets-Sheet 2
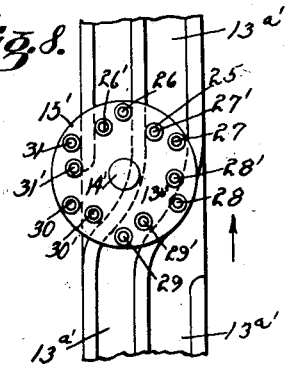
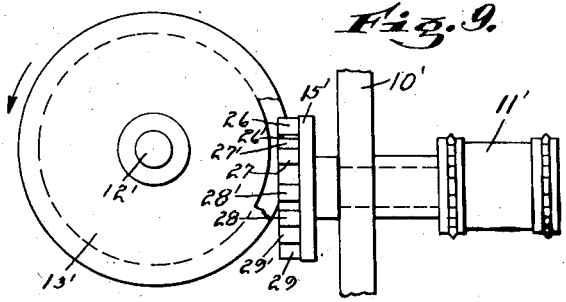
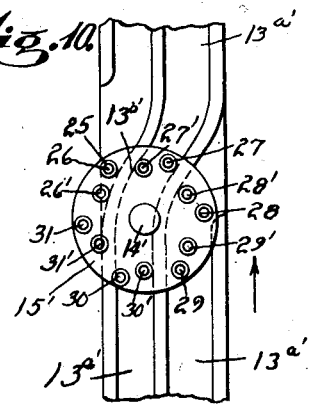
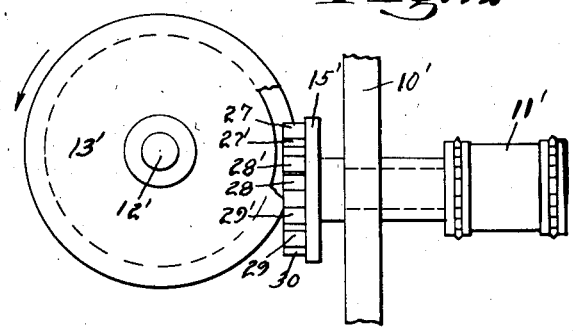
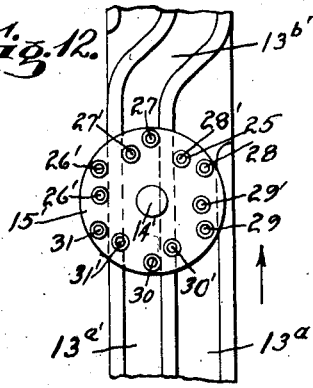
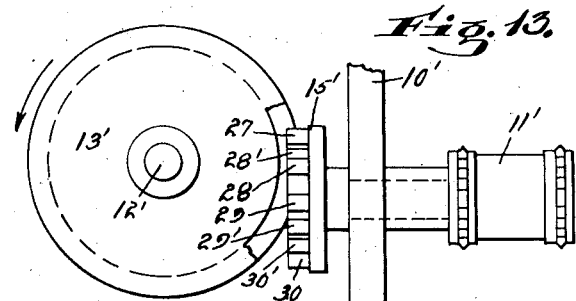
INVENTOR.
Friedrich Seufert
BY Max D. Ordmann
ATTORNEY Patented Mar. 1, 1932

1,847,312

UNITED STATES PATENT OFFICE

FRIEDRICH SEUFERT, OF MUNICH, GERMANY, ASSIGNOR OF FIFTY PER CENT TO HERMAN SEUFERT, OF BROOKLYN, NEW YORK

FILM FEEDING MECHANISM FOR CINEMA OR LIKE APPARATUS

Application filed May 12, 1930, Serial No. 451,677, and in Germany May 15, 1929.

The present invention relates to cinema or like projecting apparatus of the type described in my copending application, Ser. No. 273,221, filed April 27, 1928, and relates particularly to improvements over the invention therein described.

In the cinematic field my said earlier application has described the use of devices propelled by cam grooves for the step by step feeding of the film in taking of the picture, or projecting the same, or making copies thereof. The earlier described form of construction, for a speed of picture change of about every 16-22 seconds, in most cases, is sufficient as far as exact feeding, locking and noiseless run are concerned. However, if speed is desired that is greater than that above mentioned special devices are required for taking the load off the individual feeding elements for effecting an easier start from idle and for insuring proper operation even when one of the feeding elements breaks.

In modern constructions which show the pivots of a feeding mechanism operating either in pairs or individually or of which two operate successively, the said pivots are either parallel or to perpendicular to the axis of the feed. In case of parallel guide within the cam groove, the arrangement is such that the second pivot is movable relative to the neighboring pivot and is spring actuated. This modification has the disadvantage that to bring about the movement, besides the usual feeding disk, a second feeding star is inserted which is actuated by the aforenamed spring. Apart from the increase of the cost of manufacture by the use of an additional part, the operation of this structure is no more positive because of the use of the spring particularly since the same will fail to accomplish the desired results at high speed.

One of the prime objects of the present invention is to provide high speed driving means which will eliminate the aforementioned difficulties.

Another object is to provide a mechanism which will feed one picture at a time at high speed with a minimum of wear on the said mechanism and film.

A further object is to provide a mechanism which will be securely held against accidental displacement in forward and rearward directions and while the picture is in front of the gate.

With the above and other objects in view my invention consists in the novel construction, combination and arrangement of parts as will be hereinafter more fully described and defined in the appended claims.

In the accompanying drawings which form part of this specification and in which similar reference characters denote corresponding parts:—

Fig. 1 is a partial sectional plan view of a picture projecting apparatus equipped with my novel means;

Fig. 1a is a sectional detail of the locking means to prevent movement of the film feed in the wrong direction;

Figs. 2-7 inclusive show in detail front and side elevations of my new mechanism in different operating positions; and Figs. 8-13 inclusive show similar views as said last named views of a modified construction.

Referring to the drawings more in detail, 10 denotes the gear casing of the projecting apparatus. 11 denotes one of the sprocket drums for feeding a film (not shown). 12 denotes the driving shaft which may be driven from any suitable power source (not shown). Fixed on the driving shaft 12 is a cam in form of a cylindrical body 13 formed circumferentially with a cam groove 13$^a$ having a helically curved portion 13$^b$ of relatively small pitch and so shaped that a single revolution of said cam will cause the exact feed of the film loop the length of a single picture without jerks through means to be presently described.

The sprocket drum 11 is fixed on a spindle 14 which is borne in the frame 10 and which projects into the casing. On its inner end said spindle bears a cylindrical body or disk 15 which has a rearwardly projecting portion 16. The said disk is fixed to the spindle and to prevent rotation of said disk in the wrong direction suitable means such as an annular member or ring 17 is fixed to the wall of said casing 10, concentrically arranged with respect to disk 15. The said ring has a series of tapered cavities 17' open on their inner sides and arranged tangentially relative to the inner circumference of said disk 15. Borne in these cavities are rollers 18 actuated by springs 19 fastened to said ring 16 which tend to pull said rollers into the narrowest ends of said cavities. Thus any attempt to rotate the disk 15 in the wrong direction causes it to lock by reason of the wedging of said rollers in said cavities against said portion 16 of disk 15.

The disk 15 is provided on its free face with a plurality of studs such as studs 20—20', 21—21', 22—22', 23—23' each of which may be provided with an anti-friction roller 25. The said studs are projected forwardly from said disk face and parallel to the axis of the feeding sprocket 11. The arrangement of said studs is as follows. Studs 20—23 inclusive are arranged on the circumference of one circle on said face and studs 20'—23' are arranged on the circumference of an inner concentric circle on said face. The central angle subtended between adjacent studs on the respective circles is equal and the studs of the inner circle are slightly displaced circumferentially relative to those of the outer circle. Thereby pairs of studs are adapted to cooperate in the cam groove as will be presently described. It is obvious that the central angles between pairs of studs are equal.

The cam cylinder 13 is so mounted with respect to the disk 15 as to permit the studs to engage in said cam groove 13ᵃ. Each succeeding pair of pins is adapted to engage in said cam groove for feed of the sprocket drum 11 for each rotation of the cam cylinder. In Figs. 2–7 inclusive are shown successive positions of operation of pairs of studs.

Figs. 2 and 3 show one position of engagement of the studs 20—20' and 21—21', in the groove 13ᵃ pins 20 and 21 bearing against the right hand wall of groove 13ᵃ and pins 20' and 21' bearing against the left hand wall of said groove. In this position the said disk 15 and consequently sprocket drum 11 is prevented from forward or backward movement. Should any one of the individual studs break, nevertheless the locked position will remain.

In Figs. 4—5 the cam cylinder 13 in carrying along the feeding disk 15 by studs 21 and 21' has moved into the operative portion 13ᵇ of the cam groove so that the disk 15 has been rotated about 45°. During this time the pair of studs 20—20' have become disengaged from the groove 13ᵃ and studs 22—22' are about to enter the said groove without however yet engaging the walls of said groove. This engagement only occurs after completion of the feed of disk 15 when the studs 21 and 21' have again passed into the idle part 13ᵃ of the cam groove as shown in Figs. 6 and 7 wherein pairs of studs 21 and 21' and 22 and 22' now both engage both walls of said cam groove and again prevent rotation of said disk 15 in either direction.

It will therefore, be clearly seen that except during the rotation of disk 15 during engagement of a pair of studs in the active part 13ᵇ of the cam groove, there is always complete locking of the said disk 15 against rotation in either direction because of the engagement in the inactive part of the cam groove of two pairs of studs.

In Figs. 8–13 inclusive I show a modified form of structure in which the disk 15' is provided with six pair of studs 26—26', 27—27', 28—28', 29—29', 30—30', 31—31', respectively the studs 26—31 inclusive being mounted on the circumference of one circle on the face of said disk 15' and the studs 26'—31' being mounted on the circumference of an inner concentric circle on said face. The studs of the inner concentric circle are displaced circumferentially relative to the studs on the outer circle and, as in the previously described modification, are also arranged so that the central angles subtended between respective pairs of studs are equal.

Of course, the cam cylinder groove must be slightly modified in width to smoothly operate with the six pairs of studs instead of four. The Figs. 8–13 inclusive show corresponding positions of operation for the six pairs of studs as the Figs. 2–7 inclusive show for the four pairs of studs and it will be readily seen that with the exception of the feeding position as exemplified by Figs. 10 and 11, wherein only one pair of studs as 27—27' engages the cam groove, there are always two pairs of studs engaging in the inactive portions of said cam groove.

It is quite possible to arrange fewer or greater numbers of pairs of studs to engage correspondingly modified cam grooves.

My invention may be modified in various ways without departing from the spirit thereof and I do not wish to be limited to the details shown and described.

What I claim is:—

1. In a cinema or the like apparatus the combination with the driving shaft and film feeding sprocket drum of means on said shaft revolving with the latter and having a cam groove, revoluble pairs of feeding elements rigidly connected relative to one another and adapted to successively engage said groove, said pairs being so arranged relative to one another that during the feeding of the film the length of a single picture one pair of feeding elements will engage in said groove and during the non-feeding period when said film is in front of the gate at least two pairs of said elements will be in engagement with said groove preventing said drum from accidental rotation in either direction.

2. In a cinema or the like apparatus, the combination with the driving shaft and the film feeding sprocket drum of means on said shaft revolving with the latter and having a cam groove, a plurality of revoluble rigidly connected pairs of feeding elements adapted to couple said driving shaft to said sprocket drum, said pairs of elements being adapted to successively engage said groove, said pairs being so positioned that during the feeding of the film the length of a picture only one pair will engage said cam groove and while said film is stationary in front of the gate at least two pairs of said elements will simultaneously be engaged in said groove, thereby preventing the said drum from accidental rotation in either direction.

3. In a cinema or the like apparatus the combination with the driving shaft and film feeding sprocket drum of a body formed with a groove mounted on and revolving with said shaft, said groove having a helically curved part so shaped and admeasured that a single revolution of said body will effect the feeding of the film the length of a single picture, a rotary feed producing body coupled to said drum, a plurality of pairs of projecting elements on said body fixed in position relative to one another, said pairs being adapted to engage said groove and being so arranged that during feeding of the film only one pair of said elements will be engaged in said groove and while said film is at rest in front of the gate at least two pairs of said elements will engage said groove and prevent said drum from accidental rotation in either direction.

4. In a device as per claim 1, in which said pairs of elements are so mounted on said feed producing body that the central angle between respective pairs is equal.

5. In a device as per claim 1, in which said pairs of elements are so mounted on said feed producing body that one element of each pair is arranged on the circumference of a circle and the other element of said pair is arranged on the circumference of a second circle concentric with the first.

6. In a device as per claim 1, in which said pairs of elements are so mounted on said feed producing body, that one element of each pair is arranged on the circumference of a circle and the other element of each pair is arranged on the circumference of a second circle concentric with the first, said second element being displaced circumferencially relative to said first element and the central angle subtended between respective pairs of elements being equal.

7. In a device as per claim 1, in which means are provided for permitting rotation of said feeding drum in one direction only.

In testimony whereof I affix my signature.

FRIEDRICH SEUFERT.